3,459,687
ION EXCHANGE RESINS FROM DIOXA-SPIROHEPTANE CROSS-LINKED OXE-TANE POLYMERS
Richard G. Bufton, San Jose, Calif., assignor to Diamond Shamrock Corporation, Cleveland, Ohio, a corporation of Delaware
No Drawing. Filed May 3, 1967, Ser. No. 635,692
Int. Cl. C08g 23/04
U.S. Cl. 260—2.1                                4 Claims

ABSTRACT OF THE DISCLOSURE

Ion-exchange resins of high capacity coupled with high thermal and hydrolytic stability have been prepared by introducing into a polymer of a 3,3-disubstituted oxetane functional ion-exchange substituents, e.g., anionic or cationic groups.

Background of the invention

This invention relates to ion exchange resins of high capacity and stability which are derived from polymers of 3,3-disubstituted oxetane and to the methods for preparing these resins.

Ion exchange resins are well known in the art. They are commonly prepared by attaching functional ion exchange groups to resin matrices. The term "resin matrix" or "resin matrices" as employed herein designates the hard, infusible carrier resin or resins that are insoluble in polar and nonpolar solvents, to which functional ion exchange groups are attached. The ion exchange resin matrices may either be crosslinked or uncrosslinked linear aromatic polymers. The resin matrix, either in granular or bead form, may be converted to an ion exchange resin by first subjecting the resin matrix to haloalkylation whereby a plurality of active haloalkyl, e.g., bromoalkyl or chloroalkyl, groups are introduced into the aromatic nuclei.

The halolalkylated resin matrix may then be reacted with either a tertiary amine, e.g., trimethylamine or dimethylethanolamine, the prepare anionic exchange resins; dimethyl sulfide to produce a sulfonium derivative which is also an anionic type exchange resin; a trialkyl phosphite, e.g., triethyl phosphite, the reaction product of which is subjected to hydrolysis to prepare a phosphonic acid cation exchange resin; an alkali cyanide, e.g., sodium cyanide to prepare a nitrile which is hydrolyzed to produce a carboxylic acid cation exchange resin; or a sulfonic cation exchange resin may be prepared by sulfonating the resin matrix with a sulfonating agent. Also, ion exchange resins may contain more than one type of ion exchange group, e.g., sulfonium groups and phosphonic acid groups.

The preparation of polymers from 3,3-disubstituted oxetane is likewise known. For instance, high molecular weight linear polymers of 3,3-bis(chloromethyl)oxetane have been prepared by a variety of methods in accordance with numerous patent disclosures, e.g., U.S. Patents Nos. 2,722,520, 2,895,931, 2,905,647 and 2,909,492. Typically, such methods comprise contacting under various prescribed conditions the 3,3-bis(chloromethyl)oxetane monomer with, for example, a Lewis acid catalyst. Characterized by excellent thermal and chemical stability, these 3,3-disubstituted oxetane polymers have been easily adapted heretofore to conventional thermoplastic processing techniques for the fabrication of various useful plastic items, e.g., moldings, films, filaments, sheetings, rods, tubes and the like.

Summary of the invention

It is an object of this invention to prepare ion exchange resins from polymers of 3,3-disubstituted oxetane.

Another object of this invention is to provide ion exchange resins of high capacity and good thermal and hydrolytic stability from polymers of the said 3,3-disubstituted oxetane.

Accordingly, the present invention comprises introducing into a polymer of a 3,3-disubstituted oxetane functional ion exchange substituents, which may be either anionic or cationic in functionality depending upon the particular compound reacted with the oxetane resin matrix to produce the ion exchange resin product. The treatment of the oxetane resin matrix with the compound supplying the functional ionic groups is carried out by any of the known and presently used procedures for preparing any anion or cation exchange resin. The compounds which suitably may be reacted with the oxetane resin matrix in accordance with this invention include, for example, the amino mono- and polyamines which supply alkylene and poly(alkyleneamino) functional groups; alkyl sulfides; alkyl phosphites; and other compounds used heretofore in the art which supply mercapto, thiourea, sulfonic and carboxylic acid functional radicals. The ion exchange resin products prepared have high capacity and are further characterized by good heat and chemical stability, i.e., will remain comparatively stable in capacity even with prolonged contact with acids or bases at relatively high temperatures.

Description of the preferred embodiments

The present invention encompasses an ion exchange resin having either anionic or cationic functionality, which resin is prepared from a polymer of a 3,3-disubstituted oxetane by treatment thereof with compounds supplying anion or cation functional groups as described hereinafter.

The resin matrices of the present invention comprise a polymer of a 3,3-disubstituted oxetane having the structural formula

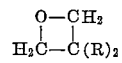

wherein R is a hydrocarbon radical (aliphatic, straight or branched, cyclic or aromatic, saturated or unsaturated, substituted or unsubstituted) containing 1 to 12, preferably 1 to 8, carbon atoms. Exemplary of hydrocarbon substituents include alkyl, e.g., methyl, ethyl, propyl, isopropyl, butyl, t-butyl, hexyl, octyl and nonyl; alkenyl, e.g., vinyl, 1-propenyl, allyl, 3-hexenyl and 4-octenyl; alkynyl, e.g., ethynyl, propargyl and 3-hexynyl; cycloalkyl, e.g., cyclopropyl, cyclobutyl, cyclopentyl, cyclohexyl and 4-methyl cyclohexyl; aryl, e.g., phenyl, p-tolyl and benzyl; halolkyl, e.g., preferably containing 1 to 4 carbon atoms, chloro-, fluoro-, iodo- and bromoalkyls; and other displaceable groups in addition to the halogen such as esters, e.g., acetates, tosylates, namely, esters of p-toluene sulfonic acid, brosylates, namely, esters of p-bromobenzene sulfonic acid and the like. R may be the same or different radical. Specific oxetane monomers include 3,3-bis(chloromethyl)oxetane, 3,3 - bis - (fluoroethyl)oxetane, 3.3 - bis-(bromomethyl)oxetane, 3,3-bis(chloroethyl)oxetane, 3,3-bis(phenoxymethyl)oxetane, 3 - chloromethyl - 3 - methyl oxetane, 3,3-dimethyl oxetane, 3,3-diethyl oxetane and 3,3-dipropyl oxetane with the 3,3-bis(haloalkyl)oxetanes being preferred because of their comparatively high reactivity with amines without the need to introduce any haloalkyl group in the polymer matrix; 3,3-bis(chloromethyl)oxetane being especially preferred because of its ready availability. The base resin matrix can either be a homopolymer of the 3,3-disubstituted oxetane or a copolymer of 3,3-disubstituted oxetane, for instance, copolymers of the aforementioned oxetane monomers. However, an especially preferred comonomer which when copolymerized with 3,3'-bis(chloromethyl)oxetane produces an exceptionally good resin matrix is 3,6-dioxaspiro-(3,3)-heptane having the structure:

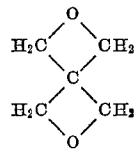

Preparation of a resin matrix containing a polymer of 3,3-disubstituted oxetane may be carried out in the presence of an inert organic liquid diluent. Any inert organic liquid solvent which does not react either with the monomer or catalyst employed may be used as the diluent for this polymerization, for instance, liquid sulfur dioxide; hydrocarbons, such as heptane, decane, benzene, toluene; chlorinated solvents such as methylene chloride, chloroform, carbon tetrachloride, dichlorobenzene, nitropropane, and nitrobenzene. Also, the diluent should not retard the polymerization by causing chain termination, such as for instance, an alcohol. Polymerization catalysts include the Friedel Craft type catalysts, such as boron trifluoride and aluminum chloride, aluminum hydride and aluminum amalgam. The amount of catalyst which is employed may vary over a wide range but usually is within the range of 0.01% to about 10%, preferably within the range of 0.1% to about 4%, based on the weight of the monomer. The temperature at which polymerization is carried out may vary over a wide range and is generally within the range from about —80° up to 350° C., preferably —50° C. up to about 300° C. Polymerization is generally completed within about ½ hour up to approximately 10 hours with the longer time being preferred in order to obtain a higher conversion of the monomer or monomers to the polymer or copolymer. The polymerization reaction may be performed in either a batch-wise or continuous manner and the polymer obtained may be separated either by filtration, if a large amount of solvent is employed as diluent, or by extracting monomer and catalyst residues from the polymer with a liquid such as methanol, ethanol and isopropanol. Such methods for polymerizing 3,3-disubstituted oxetane polymers are adequately described in the aforementioned patents. When the resin matrix comprises a copolymer of 3,3-disubstituted oxetane the resin matrix may be prepared by copolymerizing a major amount, e.g., from 60 to 99.9%, preferably 80% to 99.5%, by weight, of the monomer mixture of the 3,3-disubstituted oxetane and a minor amount, e.g., from 0.1% to 40%, preferably 0.5% to 20%, by weight, of the monomer mixture of the cross-linking monomer, e.g., 3,6-dioxaspiro(3,3)heptane.

In the practice of this invention, the 3,3-disubstituted oxetane containing resin matrix may be effectively treated in either powder or granular form. Presently preferred are polymer granules of varying size and configuration which advantageously have a porous structure. It is also essential that the average molecular weight of the polymer to be employed is sufficiently high so that it does not swell excessively or become water-soluble when functional ion exchange groups are attached to the resin matrix.

For instance, weak-base anion exchange resins may be prepared by reacting 3,3-bis(chloromethyl)oxetane homopolymer with any functional compound capable of reacting with the halide group. Exemplary of such functional groups include amino monoamines, such as methylamine and dimethylamine, or polyamines, such as ethylenediamine, hexamethylenediamine, e.g., 1,6-diaminohexane, diethylenetriamine, triethylenetetraamine, and the like with the polyamines being preferred, since they yield resin products of greater exchange capacity and exhibit much less volume change when treated alternatively with acids and bases. The amount of functional compound and resin matrix will depend in large part on the reactivity and functionality of the compound employed, but typical molar ratios range from about 2 to 10 mols of functional compound per mol of resin matrix. Thus, when the resin matrix is reacted with an amine, the aminated resin product obtained contains recurring 3,3-disubstituted oxetane units interspersed with similar units having nitrogen-containing functional groups attached thereto, which latter units may be represented by the structural formula:

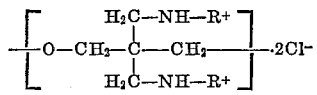

wherein each R can be alkyl, alkyleneamino, or poly(alkyleneamino), i.e., bis(alkyleneamino), tris(alkyleneamino), etc., depending upon the type and functionality of the particular amine employed.

The novel ion exchange resins of the present invention are characterized by good heat and chemical stability; for instance, the amine anion exchange resins have stable weak-base capacity even at prolonged contact with acids or bases at relatively high temperatures and have little tendency to change volume during the normal exhaustion and regeneration cycles in use. Also, an ion exchange resin of the present invention employing a homopolymer of 3,3-disubstituted oxetane as the resin matrix may have its exchange capacity improved while maintaining equivalent thermal and hydrolytic stability by agitating and heating the ion exchange resin, for instance, an aminated resin, at a temperature ranging from about 35° to 350° C., preferably from about 75° to 300° C., at standard pressure in either 6 N HCl (110° C.) or diphenyl ether (200° C.) as the stirring medium for a time ranging from about 0.5 hour up to about 24 hours, preferably from 2 hours to 20 hours. It is believed that this heat treatment produces a predominantly crosslinked product, for instance, heat-treated aminated resins of the present invention are believed to have repeating units of the structure:

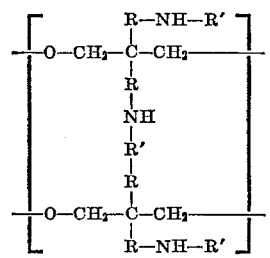

wherein R is a hydrocarbon radical containing 1 to 12 carbon atoms and R' is an alkylene-amino or poly (alkylene-amino).

The weak-base capacity of ion exchange resins of the present invention employing as the resin matrix a copolymer of a 3,3'-bis(disubstituted)oxetane and 3,6-dioxaspiro(3,3)heptane are unusual with respect to the large amount of weak-base capacity obtained on a molar basis. The strong-base resin prepared from the same resin matrix has a high salt-splitting capacity and its heat stability in the regenerated or hydroxide form is acceptable. While the salt-splitting capacity of the strong-base resin employing the copolymer resin matrix decreases on heating in the regenerated form, the total capacity (the sum of the strong-base and weak-base milliequivalents per mol) remains essentially constant whereas conventional anion exchange resins show a decrease in total capacity, according to our experiments.

The following examples are given to enable those skilled in the art more fully to understand the invention.

EXAMPLE 1

A three-neck flask equipped with a stirrer and condenser is charged with 7.75 grams of a linear homopolymer of 3,3-bis(chloromethyl)oxetane called Penton which is manufactured by Hercules Powder Company and has a molecular weight ranging from about 250,000 to about 350,000 (0.5 mol calculated on the weight of monomer) and a 90% (by volume) aqueous solution of 47.5 grams (0.46 mol) of diethylenetriamine. The resulting mixture is agitated and heated at 165° C. for 72 hours. The granular aminated resin obtained is separated and washed with deionized water. A portion of this product is then heated, with agitation in 6 N HCl for 16 hours at reflux (110° C.), after which the resin thus treated is separated and washed thoroughly with water. Pertinent data are presented in Table I, below.

EXAMPLE 2

The procedure of Example 1 is followed using 7.75 grams (0.05 mol) of Penton and 50 grams (hot) of hexamethylenediamine, employed as a 90% aqueous solution, by volume. The granular aminated resin obtained is separated and washed. A portion of this product is then heated at 150° C. for 8 hours in diphenyl ether as the stirring medium, after which the treated resin is separated and water-washed.

Table I gives the weak-base capacity (in equivalents per liter of resin), the bed capacity (in milliequivalents per 0.1 mol of resin) and percent volume expansion when the free base-resin is contacted with excess 0.1 N hydrochloric acid for the resins prepared according to Examples 1 and 2.

TABLE I

| Ex. | Heat treatment | Weak-base capacity | Bed capacity | Percent expansion |
|---|---|---|---|---|
| 1 |  | 1.30 | 108 | 215 |
| 1 | HCl | 2.96 | 178 | 15 |
| 2 |  | 1.68 | 118 | 58 |
| 2 | Diphenyl ether | 3.62 | 118 | 100 |

The above data indicate that weak-base anion exchange resins of high capacity are prepared by the method of this invention. Likewise, the data indicate that the capacity of the aminated resin products of this invention is significantly increased by heat treatment of these resins in aqueous hydrochloric acid or diphenyl ether for an extended time period. For instance, when the nontreated resin of Example 1 (weak-base capacity of 1.30) is treated with HCl, the weak-base capacity increased to 2.96. Likewise, when the nontreated resin of Example 2 (weak-base capacity of 1.68) is treated with diphenyl ether, the weak-base capacity increased to 3.62.

EXAMPLE 3

A three-neck flask equipped with a stirrer and condenser is charged with 7.75 grams (0.05 mol) of Penton and a 80% aqueous solution (by volume) of 47.5 grams (0.46 mol) of diethylenetriamine. The resulting reaction mixture is agitated and heated at 165° C. for 24 hours. Fifty ml. (55 g., 0.70 mol) of dimethylsulfoxide is then added to the agitating reaction mixture and the reaction is continued at 165° C. for an additional 48 hours. The aminated resin product obtained is separated and washed with deionized water. A portion of this product is heat-treated in 6 N hydrochloric acid as described in Example 1, after which the treated resin is separated and washed with water. The weak-base capacity (equivalents per liter of resin), the bed capacity (milliequivalents per 0.1 mol product) and the percent volume expansion when converted from the free amine form to the salt form (by contact with excess 0.1 N hydrochloric acid) is determined for both the untreated and the heat-treated resin samples, with results as follows:

TABLE II

|  | Weak-base capacity | Bed capacity | Percent expansion |
|---|---|---|---|
| Untreated resin | 1.74 | 76 | 23 |
| Heat treated resin | 2.04 | 76 | 30 |

EXAMPLE 4

This example illustrates the preparation of a strong-base quaternary ammonium anion exchange resin from the weak-base anion exchange resin of Example 2.

The resin product of Example 2, which has been heated in diphenyl ether for 24 hours at 150° C., is regenerated with excess 1–2 N sodium hydroxide heated at 50° to 60° C. The regenerated resin is then charged with agitation to a flask containing 15 ml. of ethanol. To the agitated resin alcohol mixture is added 31.2 ml. of methyl iodide together with a solution of 4.8 g. of sodium hydroxide in 40 ml. of water. The resulting reaction mixture is heated and stirred for 24 hours at 35° C. The resin product obtained is separated and washed with water. The strong-base and weak-base capacities of this product are 0.87 and 0.48 equivalents, respectively, per liter of resin. The percent volume expansion of the resin during regeneration and exhaustion is 20 percent.

EXAMPLE 5

The preparation of a resin matrix comprising a copolymer of 3,3-bis(chloromethyl)oxetane and 3,6-dioxaspiro(3,3)heptane is accomplished as follows:

A three-neck, 200 ml. flask equipped with a J-shaped stirrer, Dry Ice condenser, microburet and nitrogen sparge tube is cooled to at least −15° C. with a Dry Ice acetone bath. 3.1 ml. of liquid sulfur dioxide is added to the cooled flask. A solution of 9.0 g. of 3,3-bis(chloromethyl)oxetane and 1.0 grams of 3,6-dioxaspiro(3,3)heptane (sufficient for a 10% crosslinked copolymer) is then added to the flask. 40.6 ml. of hexane (previously cooled) is then added to the mixture. Small quantities (less than 1%) of dispersing agents such as bentonite may be added at this point. The nitrogen sparge is turned on together with the stirrer and 0.92 ml. of a 48% solution of boron trifluoride in ethyl ether is added over a 15 to 20 minute period. After two hours, methanol is added and the copolymer is finally washed with excess methanol and air dried. In order to ensure that all traces of uncross-linked 3,3-bis(chloromethyl)oxetane have been removed, the polymer is then extracted overnight with cyclohexanone and then dried under vacuum (1.0 mm.) at 145° C.

The resulting copolymer is then aminated as follows:

A 250 ml. capacity steel bomb is used as the reactor for this procedure. 1.4 g. of the copolymer (0.0094 mol), 50 grams of dimethyl sulfone (high temperature solvent for this nucleophilic displacement) and 20 g. of monomethylamine are placed in the bomb. It is then heated in an oven at 165° C. for 72 hours. At the end of this time, the bomb is cooled, the contents removed, and the resulting weak-base anion exchange resin washed with excess dilute hydrochloric acid. The standard weak-base anion capacity is then determined. These data are reported in Table III, below.

Table III

| | |
|---|---|
| Weak-base capacity _____meq./ml__ | 1.81 |
| Weak-base capacity _____meq./0.1 ml__ | 105.5 |
| Volume regenerated _____ml__ | 58.0 |
| Volume exhausted _____ml__ | 89.5 |

EXAMPLE 6

The weak-base anion exchange resin of Example 5 is converted to a quaternary ammonium ion exchange resin as follows:

A three-neck flask equipped with a stirrer, condenser and thermometer is prepared. The weak-base anion resin of Example 5 is fully converted to the free amine form by cycling it with excess sodium hydroxide, and then rinsing the resin with excess deionized water unitl it is essentially free of sodium hydroxide. This resin is then placed in the flask together with 38.4 g. of sodium hydroxide, 120 ml. of ethanol, 320 ml. of water and 49.6 ml. of methyl iodide. The stirrer is turned on and the reaction is heated for 16 hours at 35° C. At the end of this time the reaction is cooled and the resin is removed and washed with excess methanol to remove the reagents. The strong-base and weak-base anion exchange capacities are then determined. These data are reported in Table IV, below.

Table IV

| | | |
|---|---|---|
| Salt-splitting anion capacity | meq./ml | 1.24 |
| Salt-splitting anion capacity | meq./0.1 mol | 91.5 |
| Weak-base capacity | meq./ml | 0.29 |
| Weak-base capacity | meq./0.1 mol | 21.0 |
| Volume regenerated | ml | 89.5 |
| Volume exhausted | ml | 74 |

EXAMPLE 7

The preparation of a sulfonic-type cation exchange resin is accomplished as follows:

A steel bomb is used as the apparatus in which this reaction is carried out. 1.4 g. of the copolymer resin matrix of Example 5 is reacted with 19 g. of thiourea in the presence of 50 ml. of dry dimethyl formamide (which is the best solvent for this displacement). The reaction is run at 165° C. for 72 hours in an oven. Upon completion of the reaction, the bomb is cooled and the resulting thiuronium salt of the polymer is thoroughly washed with methanol in order to remove the reactants. The thiuronium polymer is directly oxidized to a sulfonic acid by placing it in a three-neck flask equipped with a stirrer. 150 ml. of glacial acetic acid is added, and then 150 ml. of a 30% aqueous solution of hydrogen peroxide is added over a 20-minute period. A 5° C. temperature rise is usually noted at this point. The reaction is allowed to run at ambient temperature for 16 hours. Following this, the resulting sulfonic acid-type cation exchange resin is washed free of reactants and the strong cation capacity is determined by the usual methods and is designed as Resin A in Table V, below.

Alternatively, the thiuronium salt may be converted to a sulfonic acid cation exchange resin through a polymer-captan intermediate by placing the thiuronium salt in a three-neck flask equipped with a stirrer and condenser and a source of heat. The polymer is heated with 81.0 ml. of ethanol and 8.1 g. of sodium hydroxide at reflux for 24 hours. It is then washed free of base with water. The polymercaptan is oxidized to the corresponding polymeric sulfonic acid by the same procedure as that used above. The salt-splitting cation capacity is then determined by standard methods and is designated as Resin B in Table V, below.

TABLE V

| | Salt-splitting cation capacity, meq./ml. | Salt-splitting cation capacity, meq./0.1 mol | Weak-acid cation capacity, meq./ml. | Weak-acid cation capacity, meq./0.1 mol | Volume regenerated, ml. | Volume exhausted ml. |
|---|---|---|---|---|---|---|
| Resin A | 0.57 | 41.5 | 0.39 | 21.0 | 142.0 | 142.0 |
| Resin B | 0.70 | 44.7 | 0.43 | 27.5 | 63.0 | 63.0 |

It is to be understood that although the invention has been described with specific reference to particular embodiments thereof, it is not to be so limited, since changes and alterations therein may be made which are within the full intended scope of this invention as defined by the appended claims.

I claim:

1. An ion-exchange resin consisting essentially of a cross-linked resin matrix having ion-exchanging groups thereon, said resin matrix consisting of from 60 to 99.9 percent by weight of a linear polymer selected from the group consisting of homopolymers and copolymers of 3,3-disubstituted oxetanes having the structure

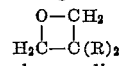

wherein R is a hydrocarbon radical of from 1–12 carbon atoms containing at least one displaceable group selected from the group consisting of halides and esters; cross-linked with 0.01 to 40%, by weight, of 3,6-dioxaspiro-(3,3)heptane; the ion exchanging groups being selected from the group consisting of amino, quarternary ammonium, sulfonic acid, sulfinic acid, phosphonic acid, mercapto, thiourea and carboxylic acid groups and being associated with the hydrocarbon radical substituent (R) of said 3,3-disubstituted oxetane by replacement of the displaceable group contained on said substituent.

2. An ion-exchange resin as in claim 1 wherein the linear polymer is a homopolymer of 3,3-bis(haloalkyl)-oxetane.

3. An ion-exchange resin as in claim 2 wherein the haloalkyl radical is chloromethyl.

4. An ion-exchange resin as in claim 1 wherein the ion exchanging groups are amino groups.

References Cited

UNITED STATES PATENTS

| | | | |
|---|---|---|---|
| 2,909,492 | 10/1959 | Schilling | 260—2 |
| 3,112,280 | 11/1963 | Farthing | 260—2 |
| 3,262,892 | 7/1966 | Hay | 260—2.2 |
| 3,262,911 | 7/1966 | Hay | 260—47 |
| 3,341,475 | 9/1967 | Vandenberg | 260—2 |
| 2,801,223 | 6/1957 | Greer | 260—2.1 |
| 3,311,572 | 3/1967 | Storey et al. | 260—2.1 |

FOREIGN PATENTS

| | | |
|---|---|---|
| 848,132 | 9/1960 | Great Britain. |
| 848,764 | 9/1960 | Great Britain. |
| 893,286 | 4/1962 | Great Britain. |
| 919,965 | 2/1963 | Great Britain. |

OTHER REFERENCES

Akiyoshi et al.: Kogyo Kagaku Zasshi 63, 541–3 (1960).

Reid: Organic Chemistry of Bivalent Sulfur, N.Y., Chem. Pub. Co., vol. I, 1958 (pages 32 and 33); vol. V, 1963 (pages 27–29).

Kharasch: Organic Sulfur Compounds, N.Y., Pergamon Press, vol. I, 1961 (page 97).

WILLIAM H. SHORT, Primary Examiner

M. GOLDSTEIN, Assistant Examiner

U.S. Cl. X.R.

260—2